United States Patent [19]

Schiller et al.

[11] 4,405,425

[45] Sep. 20, 1983

[54] FLAME-RETARDANT POLYSILOXANE ELASTOMERS

[75] Inventors: August Schiller, Neuötting, Fed. Rep. of Germany; Dietrich Wolfer, Untereching, Austria

[73] Assignee: Wacker-Chemie GmbH, Munich, Fed. Rep. of Germany

[21] Appl. No.: 220,473

[22] Filed: Dec. 29, 1980

[30] Foreign Application Priority Data

May 14, 1980 [DE] Fed. Rep. of Germany ....... 3018549

[51] Int. Cl.$^3$ .......................... C08K 3/22; C08K 3/04
[52] U.S. Cl. .............................. 204/159.13; 524/430; 524/437; 524/400; 524/495; 524/496; 524/588
[58] Field of Search ............... 524/400, 413, 430, 437, 524/432, 444, 449, 588, 495, 496; 523/212, 215; 106/307; 423/448; 204/159.13

[56] References Cited

U.S. PATENT DOCUMENTS

| | | | |
|---|---|---|---|
| 3,137,670 | 6/1964 | Maneri | 524/588 |
| 3,234,115 | 2/1966 | Pike | 524/588 |
| 3,268,473 | 8/1966 | Brown | 524/588 |
| 3,574,644 | 4/1971 | Olstowski et al. | 106/307 |
| 3,696,090 | 10/1972 | Lampe | 524/588 |
| 3,821,140 | 6/1974 | Milbert | 524/588 |
| 3,836,480 | 9/1974 | Bargain | 524/588 |
| 3,912,671 | 10/1975 | Kondo et al. | 524/588 |
| 3,965,065 | 10/1976 | Elliott | 524/588 |
| 4,221,693 | 9/1980 | Getson et al. | 523/215 |
| 4,288,360 | 9/1981 | Bobear | 524/588 |

OTHER PUBLICATIONS

A. M. Bueche "Filler Reinforcement of Silicone Rubber" J. Polymer Science, vol. XXV, pp. 139–149 (1957).
Meals et al., *Silicones*, pp. 34 to 43, Reinhold Pub. Co. N.Y. (1959).
Noll, Walter–*Chemistry & Technology of Silicones* pp. 400 to 409 Academic Press, N.Y. (1968).
Kraus, G. *Reinforcement of Elastomers* pp. 46 to 48, 125 to 133, 328, J. Wiley & Sons, Pub. N.Y. (1965).

*Primary Examiner*—Veronica P. Hoke

[57] ABSTRACT

Flame-retardant elastomers are prepared by adding a metal hydroxide and/or a hydrate of a metal oxide and graphite to an organopolysiloxane composition which is capable of being crosslinked to form an elastomer.

7 Claims, No Drawings

FLAME-RETARDANT POLYSILOXANE ELASTOMERS

The present invention relates to flame-retardant compositions and more particularly to flame-retardant compositions which are curable to elastomers.

BACKGROUND OF THE INVENTION

Compositions containing organopolysiloxanes and metal hydroxides or hydrates of metal oxides such as cerium hydroxide or aluminum hydrate which form curable flame-retardant or self-extinguishing elastomers are known in the art. For example, U.S. Pat. No. 3,821,140 to Milbert discloses an organopolysiloxane composition which is curable to a fire-resistant elastomer comprising (a) an organopolysiloxane rubber in which at least 50 percent of the organic radicals are methyl radicals, (b) an inorganic filler, (c) an organic peroxide, (d) from 0.001 to 0.01 parts of an additive comprising platinum and (e) either 3 to 35 parts of a rare earth metal oxide, or 1 to 8 parts of a rare earth metal hydroxide, per 100 parts of the organopolysiloxane rubber.

Also, U.S. Pat. No. 3,677,999 to Denk et al discloses a cast resin molding material base of epoxide polyester, phenol, polyurethane and silicone cast resin masses containing aluminum oxide trihydrate and a fine structured silica fossil.

In contrast to the flame-retardant and self-extinguishing elastomers described above, the compositions of this invention provide elastomers having better flame-retardant and self-extinguishing properties than the elastomers known heretofore. Furthermore, the elastomers obtained from the room temperature curable compositions of this invention exhibit higher tensile strength and better resistance to tear propagation than elastomers obtained from previously known compositions.

Therefore, it is an object of this invention to provide elastomers having improved flame-retardant and self-extinguishing properties. Another object of this invention is to provide flame-retardant elastomers having improved tensile strength. A further object of this invention is to provide flame-retardant room temperature elastomers having improved tensile strength and improved resistance to tear propagation.

SUMMARY OF THE INVENTION

The foregoing objects and others which will become apparent from the following description are accomplished in accordance with this invention, generally speaking, by providing a composition which is capable of being cured to an elastomer having improved flame-retardant and self-extinguishing properties comprising an organopolysiloxane, graphite and a compound selected from the group consisting of metal hydroxides, hydrates of metal oxides and mixtures thereof.

DETAILED DESCRIPTION OF THE INVENTION

The organopolysiloxanes employed in the compositions of this invention can be any organopolysiloxane which has been or could have been used in flame-retardant organopolysiloxane compositions known heretofore which, when cured, form elastomers. The preferred organopolysiloxanes are diorganopolysiloxanes which are represented by the general formula $$Z_n Si R_{3-n} O (Si R_2 O)_x Si R_{3-n} Z_n,$$

where R represents the same or different monovalent hydrocarbon radicals or substituted monovalent hydrocarbon radicals, Z represents a hydroxyl group or the same or different hydrolyzable atoms, n is 0, 1, 2 or 3, and x is a number having a value such the the average viscosity of these diorganopolysiloxanes is at least 50 mPa.s at 25° C.

Siloxane units other than the diorganosiloxane units ($SiR_2O$) which are not generally illustrated in the above formula representing the diorganopolysiloxanes can be present within or along the siloxane chain. Examples of such other siloxane units, which are generally present only as impurities, are those having the formulas $RSiO_{3/2}$, $R_3SiO_{\frac{1}{2}}$, and $SiO_{4/2}$, wherein R is the same as above.

In the above formula the values of n can be the same or different for the same or different molecules. Likewise, mixtures of molecules having different values for X can be present in the compositions.

Examples of hydrocarbon radicals represented by R are alkyl radicals such as the methyl, ethyl, n-propyl, and isopropyl radical, as well as the butyl and hexyl radicals; alkenyl radicals such as the vinyl, allyl and butadienyl radicals; cycloaliphatic hydrocarbon radicals such as the cyclopentyl and cyclohexyl radicals, as well as cyclohexenyl and methylcyclohexyl radicals; aryl radicals such as the phenyl radical; alkaryl radicals such as the tolyl radicals; and aralkyl radicals such as the betaphenylethyl radical.

Preferred examples of substituted monovalent hydrocarbon radicals represented by R are halogenated hydrocarbon radicals such as the 3,3,3-trifluoropropyl radical, as well as chlorophenyl and bromotolyl radicals, and the cyanoalkyl radicals such as the beta-cyanoethyl radicals.

Because of their availability, it is preferred that at least 70 percent of the average number of SiC-bonded organic radicals in the organopolysiloxanes employed in the compositions of this invention be methyl radicals. The remaining SiC-bonded organic radicals in the organopolysiloxanes employed in the compositions of this invention are preferably phenyl radicals and/or vinyl radicals.

The hydrolyzable groups represented by Z can be the same hydrolyzable groups which have been or could have been present heretofore in the hydrolyzable silicon compounds generally used in the preparation of compositions which must be stored under anhydrous conditions, but cure to form elastomers when exposed to moisture at room temperature. Examples of suitable hydrolyzable groups represented by Z are acetoxy, ethoxy, methoxyethyleneoxy, dimethylaminoxy, n-butylamino, sec-butylamino, cyclohexylamino, benzoylmethylamino, and 2-butanonoxime groups.

Examples of hydrolyzable atoms represented by Z are chlorine and hydrogen atoms.

Crosslinking agents which may be employed in the compositions of this invention are those which are generally used in the preparation of compositions which must be stored under anhydrous conditions, but when exposed to moisture at room temperature crosslink to form elastomers. Examples of suitable crosslinking agents are methyltriacetoxysilane, methyl(tert-butoxy)acetoxysilicon compounds having a total of 3 tert-butoxy and acetoxy groups per molecule, methyltris(cyclohexylamino)silane, and methyltris(2-butanonoxime)- silane, and mixtures of methyltris (cyclohexylamino)silane and methyltris(2-butanonoxime)silane.

Crosslinking agents which may be employed in the compositions of this invention just prior to their final shaping, when the compositions are stored at temperatures above −15° C., are hexaethoxydisiloxane and an ethyl polysilicate having an $SiO_2$ content of about 40 percent by weight.

Examples of other crosslinking agents which may be incorporated in the compositions of this invention, even for long periods of time prior to their final shaping, are methylhydrogenpolysiloxanes and platinum catalysts.

Crosslinking agents which can be present in the compositions of this invention for long periods of time before their final shaping, are organic peroxidic compounds such as benzoyl peroxide, dicumyl peroxide and bis(2,4-dichlorobenzoyl) peroxide.

The crosslinking agents can be present in the compositions of this invention in the same amounts as have been used heretofore in known compositions which cure to form elastomers, or they can be added to these compositions in the same amounts as they were added to compositions known heretofore in which the crosslinking agents are added shortly prior to final shaping. The crosslinking agents may, however, be omitted from the compositions when they are crosslinked by high-energy radiation such as alpha-, beta- or gamma-radiation.

Examples of additives which can be present in the compositions of this invention other than the organopolysiloxanes, crosslinking agents, if desired, metal hydroxides and/or hydrates of metal oxides and graphite, are reinforcing fillers, non-reinforcing fillers, pigments, soluble dyes, organopolysiloxane resins including those made of $(CH_3)_3SiO_{\frac{1}{2}}$ and $SiO_{4/2}$ units, corrosion inhibitors, oxidation inhibitors, heat stabilizers, solvents, agents which improve the adhesion of the elastomers prepared from the compositions of this invention to substrates, such as 3-(2-aminoethylamino)propyltrimethoxysilane or reaction products of 3-(2-aminoethylamino)propyltrimethoxysilane with dimethylpolysiloxane containing Si-bonded hydroxyl groups, condensation catalysts such as tin salts or organotin salts of carboxylic acids, for example di-butyltin dilaurate; agents which increase the non-slump properties, such as alkylphenolpolyethylene glycol ethers; and plasticizers such as trimethylsiloxy terminated dimethylpolysiloxanes which are liquid at room temperature, or phosphoric acid esters, ultraviolet absorbers and foaming agents such as azodicarbonamide; as well as agents used to prevent the compositions from solidifying while in storage, such as dimethylpolysiloxanes having one Si-bonded hydroxyl group in each terminal unit and a viscosity of from 2 to 50 mPa.s at 25° C.

Examples of reinforcing fillers, or fillers having a surface area of at least 50 m$^2$/g are pyrogenically produced silicon dioxides, dehydrated silicic acid hydrogels and other types of precipitated silicon dioxide having a surface area of at least 50 m$^2$/g, and metal oxides having a surface area of at least 50 m$^2$/g, such as titanium dioxide, ferric oxide, aluminum oxide and zinc oxide.

Examples of non-reinforcing fillers, or fillers having a surface area of less than 50 m$^2$/g are quartz meal, diatomaceous earth, Neuburg chalk, calcium silicate, zirconium silicate, calcium carbonate, e.g., in the form of ground chalk, calcined aluminum silicate and powdered sodium aluminum silicate having molecular sieve properties.

The compositions of this invention can also contain fibrous fillers such as asbestos and/or glass fibers, especially those having an average maximum length of 0.5 mm.

All of the above reinforcing and non-reinforcing fillers can be, for example, treated with trimethylethoxysilane or stearic acid to impart hydrophobic properties thereto. If desired, such treatment can be carried out in advance, for example in a ball mill.

Mixtures of different reinforcing and/or non-reinforcing fillers may be used in the compositions of this invention.

Metal hydroxides and/or hydrates of metal oxides which have been used or could have been used heretofore with organic or organosilicon polymers can be used as the metal hydroxide and/or hydrate of a metal oxide in the compositions of this invention. Alumina trihydrate [$Al(OH)_3$], which is also represented by the formula $Al_2O_3.3\ H_2O$, is the preferred hydrate of a metal oxide. Other examples of suitable metal hydroxides or hydrates of metal oxides are ceric hydroxide, cerous hydroxide, tricalcium aluminate hexahydrate, and magnesium hydroxide.

If desired, mixtures of different metal hydroxides and/or hydrates of metal oxides, e.g., a mixture of $Al(OH)_3$ and tricalcium aluminate hexahydrate can be employed in the compositions of this invention.

Preferably, the metal hydroxides and/or hydrates of metal oxides present in the compositions of this invention have organosiloxy groups present on their surface. Among those organosiloxy groups, which may be present are preferably those having the formula $CH_2=CHSiO_{3/2}$, particularly when an elastomer having an especially high mechanical strength is desired.

The compositions of this invention preferably contain metal hydroxides and/or hydrates of metal oxides, particularly $Al(OH)_3$, in an amount of from 10 to 60 percent by weight, and more preferably from 30 to 55 percent by weight, based on the total weight of the composition. At lower concentrations, the degree of flame-retardancy is not sufficient for many applications, while higher concentrations can reduce the mechanical properties of the resultant elastomers to a degree which is undesirable for many applications.

Preferably, the graphite has a surface area of from 3 to 15 m$^2$/g, and more preferably from 8 to 11 m$^2$/g.

The compositions of this invention preferably contain graphite in an amount of from 0.5 to 30 percent by weight, and more preferably from 1 to 5 percent by weight, based on the weight of the composition.

In preparing the compositions of this invention, the components can be mixed in any sequence. Preferably, the components are mixed at room temperature. If desired, however, mixing can be also be done at higher temperatures, for example, at a temperature of from about 35° to 200° C. Heat-sensitive components such as the organic peroxide compounds, for example, can be mixed only at temperatures where they do not become active.

The forming and crosslinking of the compositions of this invention can be accomplished in any conventional manner at room temperature or at temperatures above or below room temperature.

The compositions of this invention can be used in electrical or electronic devices, in manufacturing extruded packing material, or as joint-sealing compounds.

In the following Examples, all parts are by weight unless otherwise specified. The degree of flame-retardancy is indicated by the LOI (Limited Oxygen Index) value as determined by ASTM D2863-70. The higher the value, the greater the degree of flame-retardancy.

Tensile strength is determined in accordance with DIN 53 504 (Deutsche Industrie Norm) with a standard S3A bar, and the tear resistance is determined according to ASTM D 624 with a standard B bar.

EXAMPLE 1

About 6 parts of an equimolar mixture of methyltris(cyclohexylamino)silane and methyltris(2-butanonoxime)silane are mixed with a mixture consisting of 20 parts of a trimethylsiloxy end-blocked dimethylpolysiloxane having a viscosity of 100 mPa.s at 25° C., about 30 parts of a dimethylpolysiloxane having one Si-bonded hydroxyl group in each terminal unit and a viscosity of 80,000 mPa.s at 25° C., 1 part of tri-n-butylphenol which has been etherified with polyethylene glycol containing 13 ethyleneoxy units, and 0.5 parts of 3-(2-aminoethylamino)propyltrimethoxy silane.

To the mixture thus obtained are added about 36 parts of ground Al(OH)$_3$ having a surface area of about 7 m$^2$/g which has been treated with vinyltriethoxysilane, to provide organosiloxy groups on its surface, then 4 parts of graphite with a surface area of about 10 m$^2$/g, then 3 parts of silicon dioxide which has been produced pyrogenically in the gaseous phase and having a surface area of approximately 150 m$^2$/g, and finally 0.1 part of dibutyltin dilaurate.

The composition thus obtained is injected into tubes and stored for 24 hours at room temperature. A sample from these tubes is applied as a coating 2±0.1 mm thick and stored for a total of 4 weeks at 23° C. and at 50 percent relative humidity.

The properties of the resultant elastomer are shown in Table 1.

EXAMPLE 2

The procedure described in Example 1 is repeated except that 36 parts of Al(OH)$_3$ having a surface area of about 7 m$^2$/g, which is free of organosiloxy groups is substituted for the treated Al(OH)$_3$.

EXAMPLE 3

The procedure described in Example 1 is repeated, except that 2 parts of graphite having a surface area of about 10 m$^2$/g is substituted for the 4 parts of graphite.

COMPARISON EXAMPLE V-1

The procedure described in Example 1 is repeated except that 40 parts of the Al(OH)$_3$ having organosiloxy groups on its surface is substituted for the 36 parts of Al(OH)$_3$ and the graphite is omitted.

COMPARISON EXAMPLE V-2

The procedure described in Example 1 is repeated except that 40 parts of ground chalk which is coated with stearic acid is substituted for the 36 parts of Al(OH)$_3$ containing organosiloxy groups on its surface and the 4 parts of graphite.

COMPARISON EXAMPLE V-3

The procedure described in Example 1 is repeated except that 36 parts of ground chalk which is coated with stearic acid is substituted for the 36 parts of Al(OH)$_3$ containing organosiloxy groups on its surface.

TABLE 1

|  | Examples ||| Comparison Examples |||
|---|---|---|---|---|---|---|
|  | 1 | 2 | 3 | V-1 | V-2 | V-3 |
| LOI-Value, Percent | 40 | 37 | 38 | 30 | 26 | 28 |
| Tensile Strength, N/mm$^2$ | 1.8 | 2.0 | 1.8 | 1.5 | 1.2 | 1.3 |
| Tear Resistance, N/mm | 12.4 | 10.5 | 9.4 | 8.4 | 5.2 | 5.5 |

The elastomer obtained from Example 1 was also tested in a fire shaft in accordance with DIN 4102 "Burning Behavior of Structural Materials and Structural Parts", Part 1 "Structural materials: terminology, specifications and tests". The test specimens consisted of strips of elastomer 6 mm wide and 5 mm thick between two asbestos plates 200 mm·17 mm·5 mm.

Results

Average value of the remaining length of each tested specimen: 39 percent. Average flue gas temperature: 115° C.

The composition meets the requirements for being classified as a structural material class B1 (not easily inflammable structural materials).

EXAMPLE 4

About 100 parts of a trimethylsiloxy end-blocked diorganopolysiloxane, consisting of 99.93 mole-percent dimethylsiloxane units and 0.07 mole-percent vinylmethylsiloxane units with a viscosity of 8·10$^6$ mPa.s at 25° C. is thoroughly mixed in a kneader operated at 150° C. with 35 parts of silicon dioxide produced pyrogenically in the gaseous phase, having a surface area of 200 m$^2$/g, then with 1 part of a trimethylsiloxy endblocked dimethylpolysiloxane having a viscosity of 96 mPa.s at 25° C., then with 7 parts of dimethylpolysiloxane having one Si-bonded hydroxyl group in each terminal unit with a viscosity of 40 mPa.s at 25° C., and then again with one part of a trimethylsiloxy end-blocked dimethylpolysiloxane having a viscosity of 95 mPa.s at 25° C. After cooling to 110 C., 160 parts of ground Al(OH)$_3$ having a surface area of about 7 m$^2$/g, which has been treated with vinyltriethoxysilane to provide organosiloxy groups on its surface and 4 parts of graphite having a surface area of about 10 m$^2$/g, are mixed with the first mixture, and after cooling to room temperature, 12 parts of a mixture consisting of equal parts of bis(2,4-dichlorobenzoyl)peroxide and trimethylsiloxy end-blocked dimethylpolysiloxane having a viscosity of 250 mPa.s at 25° C. is then added.

EXAMPLE 5

The procedure described in Example 4 is repeated except that 2 parts of graphite having a surface area of about 10 m$^2$/g is substituted for the 4 parts of graphite.

COMPARISON EXAMPLE V-4

The procedure described in Example 4 is repeated except that 164 parts of Al(OH)$_3$ having organosiloxy groups on its surface is substituted for the 160 parts of Al(OH)$_3$; the graphite is omitted, and 6 parts of a mixture containing equal parts of bis(2,4-dichlorobenzoyl)peroxide and low-viscosity trimethylsiloxy end-blocked dimethylpolysiloxane is substituted for the 12 parts of the same mixture.

Two mm thick wafers are prepared from the curable compositions obtained pursuant to Examples 4 and 5 as well as Comparison Example V-4, by heating them for 10 minutes at 150° C. under a pressure of 30 bar (abs.) and then heating for 4 hours at atmospheric pressure at 150° C. and 1 hour at atmospheric pressure at 200° C.

The properties of the resultant elastomers are shown in Table 2.

TABLE 2

|  | Examples | | Comparison Example |
|---|---|---|---|
|  | 4 | 5 | V-4 |
| LOI-Value, Percent | 58 | 54 | 47 |
| Shore-A Hardness | 65 | 65 | 65 |
| Tensile Strength, N/mm² | 6.0 | 6.0 | 6.0 |
| Tear Resistance, M/mm | 16 | 14 | 14 |

What is claimed is:

1. A composition capable of being cured to form a flame-retardant elastomer consisting essentially of an organopolysiloxane, graphite having a surface area of from 3 to 15 m²/g, a compound selected from the group consisting of alumina trihydrate, ceric hydroxide, cerous hydroxide, tricalcium aluminate hexahydrate, magnesium hydroxide and mixtures thereof and a crosslinking agent.

2. The composition of claim 1, wherein graphite is present in an amount of from 1 to 5 percent by weight based on the weight of the composition.

3. The composition of claim 1, wherein the organopolysiloxane is a diorganopolysiloxane of the formula $$Z_nSiR_{3-n}O(SiR_2O)_xSiR_{3-n}Z_n$$

where R is selected from the group consisting of monovalent hydrocarbon radicals and substituted monovalent hydrocarbon radicals, Z is a hydroxyl group, n is 1 and x is a number having a value such that the average viscosity of the diorganopolysiloxane is at least 50 mPa.s at 25°.

4. The composition of claim 1, wherein the compound is alumina trihydrate.

5. The composition of claim 1, wherein the compound is ceric hydroxide.

6. The composition of claim 1, wherein the crosslinking agent is an organic peroxide compound.

7. A flame-retardant elastomer which is obtained from high energy radiation of a composition consisting of an organopolysiloxane, graphite having a surface area of from 3 to 15 m²/g, a compound selected from the group consisting of alumina trihydrate, ceric hydroxide, cerous hydroxide, tricalcium aluminate hexahydrate, magnesium hydroxide and mixtures thereof said grahite being present at from 0.5 to 3% by weight of the composition and said compound being present at from 10 to 60% by weight of the composition.

* * * * *